(12) United States Patent
Sumnicht

(10) Patent No.: US 8,177,938 B2
(45) Date of Patent: May 15, 2012

(54) METHOD OF MAKING REGENERATED CELLULOSE MICROFIBERS AND ABSORBENT PRODUCTS INCORPORATING SAME

(75) Inventor: Daniel W. Sumnicht, Green Bay, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 564 days.

(21) Appl. No.: 12/008,169

(22) Filed: Jan. 9, 2008

(65) Prior Publication Data

US 2008/0173419 A1 Jul. 24, 2008

Related U.S. Application Data

(60) Provisional application No. 60/881,310, filed on Jan. 19, 2007, provisional application No. 60/881,393, filed on Jan. 19, 2007, provisional application No. 60/994,344, filed on Sep. 19, 2007, provisional application No. 60/994,483, filed on Sep. 19, 2007.

(51) Int. Cl.
*D21H 11/00* (2006.01)

(52) U.S. Cl. .......... 162/146; 162/157.1; 162/157.6; 162/157.7; 162/176; 264/172.13; 264/172.18; 264/465; 428/362; 428/363

(58) Field of Classification Search .......... 162/146, 162/157.1, 157.6, 157.7, 176; 264/172.13, 264/172.18, 465; 428/362, 363
See application file for complete search history.

(56) References Cited

U.S. PATENT DOCUMENTS

| | | | |
|---|---|---|---|
| 2,428,046 A | 9/1947 | Sisson et al. ............. 28/82 |
| 2,440,761 A | 5/1948 | Sisson et al. ............. 18/8 |
| 3,009,822 A | 11/1961 | Drelich et al. | |
| 3,175,339 A | 3/1965 | McDowell ............ 55/74 |
| 3,209,402 A * | 10/1965 | Riley et al. ............. 425/131.5 |
| 3,337,671 A | 8/1967 | Drisch et al. | |
| 3,382,140 A | 5/1968 | Henderson et al. | |
| 3,508,941 A | 4/1970 | Johnson | |
| 3,508,945 A | 4/1970 | Haemer et al. ......... 117/8 |
| 3,785,918 A | 1/1974 | Kawai et al. | |
| 3,994,771 A | 11/1976 | Morgan, Jr. et al. ..... 162/113 |
| 4,036,679 A | 7/1977 | Back et al. | |
| 4,100,324 A | 7/1978 | Anderson et al. | |
| 4,102,737 A | 7/1978 | Morton ............ 162/113 |
| 4,145,532 A | 3/1979 | Franks et al. | |
| 4,246,221 A | 1/1981 | McCorsley, III ......... 264/203 |
| 4,267,047 A | 5/1981 | Henne et al. ......... 210/490 |

(Continued)

FOREIGN PATENT DOCUMENTS

EP 2004904 A2 12/2008

(Continued)

OTHER PUBLICATIONS

Konig et al., Chem. Commun. 2005, 1170-1172.

(Continued)

*Primary Examiner* — Matthew Daniels
*Assistant Examiner* — Jacob Thomas Minskey
(74) *Attorney, Agent, or Firm* — Laura L. Bozek

(57) ABSTRACT

A method of making regenerated cellulose microfibers includes forming segmented fibers with multiple longitudinally-extending segments of slightly different composition such that there is defined splittable interfaces between juxtaposed segments of the fibers which are then split into microfibers at yields of greater than 50%. Fibers so produced may be incorporated into absorbent sheet with other papermaking fibers to provide strength, softness, bulk and absorbency to tissue, towel, and personal care products.

49 Claims, 4 Drawing Sheets

U.S. PATENT DOCUMENTS

| | | | |
|---|---|---|---|
| 4,374,702 A | 2/1983 | Turbak et al. | |
| 4,426,228 A | 1/1984 | Brandner et al. | |
| 4,481,076 A | 11/1984 | Herrick | |
| 4,481,077 A | 11/1984 | Herrick | |
| 4,483,743 A | 11/1984 | Turbak et al. | |
| 4,529,480 A | 7/1985 | Trokhan | 162/109 |
| 4,735,849 A | 4/1988 | Murakami et al. | 428/224 |
| 4,802,942 A | 2/1989 | Takemura et al. | 156/244.13 |
| 4,908,097 A | 3/1990 | Box | |
| 4,931,201 A | 6/1990 | Julemont | |
| 4,987,632 A | 1/1991 | Rowe et al. | |
| 5,039,431 A | 8/1991 | Johnson et al. | |
| 5,124,197 A | 6/1992 | Bernardin et al. | |
| 5,227,024 A | 7/1993 | Gomez | |
| 5,269,470 A | 12/1993 | Ishikawa et al. | |
| 5,320,710 A | 6/1994 | Reeves et al. | |
| 5,354,524 A | 10/1994 | Sellars et al. | |
| 5,385,640 A | 1/1995 | Weibel et al. | |
| 5,562,739 A | 10/1996 | Urben | |
| 5,580,356 A | 12/1996 | Taylor | |
| 5,582,681 A | 12/1996 | Back et al. | |
| 5,607,551 A | 3/1997 | Farrington, Jr. et al. | 162/109 |
| H1672 H | 8/1997 | Hermans et al. | |
| 5,688,468 A | 11/1997 | Lu | |
| 5,725,821 A | 3/1998 | Gannon et al. | |
| 5,759,210 A | 6/1998 | Potter et al. | |
| 5,759,926 A | 6/1998 | Pike et al. | 442/333 |
| 5,779,737 A | 7/1998 | Potter et al. | |
| 5,858,021 A | 1/1999 | Sun et al. | |
| 5,863,652 A | 1/1999 | Matsumura et al. | |
| 5,895,710 A | 4/1999 | Sasse et al. | 442/334 |
| 5,935,880 A | 8/1999 | Wang et al. | |
| 5,964,983 A | 10/1999 | Dinand et al. | |
| 6,042,769 A | 3/2000 | Gannon et al. | |
| 6,117,545 A | 9/2000 | Cavaille et al. | |
| 6,153,136 A | 11/2000 | Collier et al. | |
| 6,183,596 B1 | 2/2001 | Matsuda et al. | |
| 6,187,137 B1 | 2/2001 | Druecke et al. | 162/109 |
| 6,214,163 B1 | 4/2001 | Matsuda et al. | |
| 6,221,487 B1 | 4/2001 | Luo et al. | |
| 6,235,392 B1 | 5/2001 | Luo et al. | 428/369 |
| 6,258,210 B1 | 7/2001 | Takeuchi et al. | |
| 6,258,304 B1 | 7/2001 | Bahia | |
| 6,267,898 B1 * | 7/2001 | Fukuda et al. | 210/767 |
| 6,287,419 B1 | 9/2001 | Takeuchi et al. | |
| 6,344,109 B1 | 2/2002 | Gross | |
| 6,471,727 B2 | 10/2002 | Luo et al. | |
| 6,491,788 B2 | 12/2002 | Sealey et al. | |
| 6,511,746 B1 | 1/2003 | Collier et al. | |
| 6,544,912 B1 | 4/2003 | Tanio et al. | |
| 6,573,204 B1 | 6/2003 | Philipp et al. | |
| 6,596,033 B1 | 7/2003 | Luo et al. | |
| 6,602,386 B1 | 8/2003 | Takeuchi et al. | |
| 6,624,100 B1 | 9/2003 | Pike | |
| 6,645,618 B2 | 11/2003 | Hobbs et al. | |
| 6,692,827 B2 | 2/2004 | Luo et al. | |
| 6,706,237 B2 | 3/2004 | Luo et al. | |
| 6,706,876 B2 | 3/2004 | Luo et al. | |
| 6,746,976 B1 | 6/2004 | Urankar et al. | |
| 6,749,718 B2 | 6/2004 | Takai et al. | |
| 6,767,634 B2 | 7/2004 | Krishnaswamy | |
| 6,773,648 B2 | 8/2004 | Luo et al. | |
| 6,808,557 B2 | 10/2004 | Holbrey et al. | 106/163.01 |
| 6,824,599 B2 | 11/2004 | Swatloski et al. | |
| 6,833,187 B2 | 12/2004 | Luo et al. | |
| 6,835,311 B2 | 12/2004 | Koslow | |
| 6,814,038 B2 | 1/2005 | Horenziak et al. | |
| 6,849,329 B2 | 2/2005 | Perez et al. | |
| 6,861,023 B2 | 3/2005 | Sealey et al. | |
| 6,872,311 B2 | 3/2005 | Koslow | |
| 6,890,649 B2 | 5/2005 | Hobbs et al. | |
| 6,899,790 B2 | 5/2005 | Lee | |
| 6,951,895 B1 | 10/2005 | Qin et al. | |
| 7,037,405 B2 | 5/2006 | Hguyen et al. | |
| 7,067,444 B2 | 6/2006 | Luo et al. | |
| 7,083,704 B2 | 8/2006 | Sealey, II et al. | |
| 7,094,317 B2 | 8/2006 | Lundberg et al. | |
| 7,097,737 B2 | 8/2006 | Luo et al. | |
| 7,195,694 B2 | 3/2007 | Von Drach et al. | |
| 7,241,711 B2 | 7/2007 | Takai et al. | |
| 7,250,382 B2 | 7/2007 | Takai et al. | |
| 7,258,764 B2 | 8/2007 | Mauler | |
| 7,276,166 B2 | 10/2007 | Koslow | |
| 7,296,691 B2 | 11/2007 | Koslow | |
| 7,381,294 B2 | 6/2008 | Suzuki et al. | |
| 7,399,378 B2 | 7/2008 | Edwards et al. | |
| 7,442,278 B2 | 10/2008 | Murray et al. | |
| 7,494,563 B2 | 2/2009 | Edwards et al. | |
| 7,503,998 B2 | 3/2009 | Murray et al. | |
| 7,566,014 B2 | 7/2009 | Koslow | |
| 7,585,388 B2 | 9/2009 | Yeh et al. | |
| 7,585,389 B2 | 9/2009 | Yeh et al. | |
| 7,588,660 B2 | 9/2009 | Edwards et al. | |
| 7,588,831 B2 | 9/2009 | Akiyama et al. | |
| 7,605,096 B2 | 10/2009 | Tomarchio et al. | |
| 7,608,164 B2 | 10/2009 | Chou et al. | |
| 7,655,112 B2 | 2/2010 | Koslow | |
| 7,662,257 B2 | 2/2010 | Edwards et al. | |
| 7,700,764 B2 | 4/2010 | Heijnesson-Hulten | |
| 7,718,036 B2 | 5/2010 | Sumnicht et al. | |
| 7,789,995 B2 | 9/2010 | Super et al. | |
| 7,820,008 B2 | 10/2010 | Edwards et al. | |
| 7,850,823 B2 | 12/2010 | Chou et al. | |
| 7,951,264 B2 | 5/2011 | Sumnicht | |
| 7,951,266 B2 | 5/2011 | Kokko et al. | |
| 7,985,321 B2 | 7/2011 | Sumnicht et al. | |
| 2001/0028955 A1 | 10/2001 | Luo et al. | |
| 2002/0031966 A1 | 3/2002 | Tomarchio et al. | |
| 2002/0036070 A1 | 3/2002 | Luo et al. | |
| 2002/0037407 A1 | 3/2002 | Luo et al. | |
| 2002/0041961 A1 | 4/2002 | Sealey et al. | |
| 2002/0060382 A1 | 5/2002 | Luo et al. | |
| 2002/0064654 A1 | 5/2002 | Luo et al. | |
| 2002/0074009 A1 | 6/2002 | Zhao et al. | |
| 2002/0074097 A1 | 6/2002 | Gross et al. | |
| 2002/0076556 A1 | 6/2002 | Luo et al. | |
| 2002/0081428 A1 | 6/2002 | Luo et al. | |
| 2002/0088572 A1 | 7/2002 | Sealey et al. | |
| 2002/0088575 A1 | 7/2002 | Lonsy et al. | |
| 2002/0096294 A1 | 7/2002 | Nicholass et al. | |
| 2002/0160186 A1 | 10/2002 | Luo et al. | |
| 2002/0168912 A1 * | 11/2002 | Bond et al. | 442/415 |
| 2003/0024669 A1 | 2/2003 | Kokko | |
| 2003/0025252 A1 | 2/2003 | Sealey et al. | |
| 2003/0056916 A1 | 3/2003 | Horenziak et al. | |
| 2003/0065059 A1 | 4/2003 | Krishnaswamy | |
| 2003/0099821 A1 | 5/2003 | Takai et al. | |
| 2003/0100240 A1 | 5/2003 | Takai et al. | |
| 2003/0135181 A1 | 7/2003 | Chen et al. | |
| 2003/0144640 A1 | 7/2003 | Nguyen | |
| 2003/0157351 A1 | 8/2003 | Swatloski et al. | |
| 2003/0159786 A1 | 8/2003 | Runge et al. | |
| 2003/0168401 A1 | 9/2003 | Koslow | |
| 2003/0177909 A1 | 9/2003 | Koslow | |
| 2003/0178166 A1 | 9/2003 | Takeuchi et al. | |
| 2003/0203695 A1 | 10/2003 | Polanco et al. | 442/365 |
| 2004/0038031 A1 | 2/2004 | Holbrey et al. | |
| 2004/0045687 A1 | 3/2004 | Shannon et al. | |
| 2004/0123962 A1 | 7/2004 | Shannon et al. | |
| 2004/0144510 A1 | 7/2004 | Mauler | |
| 2004/0178142 A1 | 9/2004 | Koslow | |
| 2004/0203306 A1 | 10/2004 | Grafe et al. | |
| 2004/0206463 A1 | 10/2004 | Luo et al. | |
| 2004/0207110 A1 | 10/2004 | Luo et al. | |
| 2004/0209078 A1 | 10/2004 | Luo et al. | |
| 2004/0226671 A1 | 11/2004 | Nguyen et al. | |
| 2004/0238135 A1 | 12/2004 | Edwards et al. | |
| 2005/0011827 A1 | 1/2005 | Koslow | |
| 2005/0051487 A1 | 3/2005 | Koslow | |
| 2005/0074542 A1 | 4/2005 | Lundberg et al. | |
| 2005/0148264 A1 | 7/2005 | Varona et al. | |
| 2005/0176326 A1 | 8/2005 | Bond et al. | |
| 2005/0217814 A1 | 10/2005 | Super et al. | |
| 2005/0241786 A1 | 11/2005 | Edwards et al. | |
| 2005/0241787 A1 | 11/2005 | Murray et al. | |
| 2005/0274469 A1 | 12/2005 | Lundberg et al. | |
| 2005/0279471 A1 | 12/2005 | Murray et al. | |

| | | | |
|---|---|---|---|
| 2005/0288484 A1 | 12/2005 | Holbrey et al. | 528/480 |
| 2006/0019571 A1 | 1/2006 | Lange et al. | |
| 2006/0090271 A1 | 5/2006 | Price et al. | 8/490 |
| 2006/0141881 A1 | 6/2006 | Bergsten et al. | |
| 2006/0207722 A1 | 9/2006 | Amano et al. | 156/327 |
| 2006/0237154 A1 | 10/2006 | Edwards et al. | |
| 2006/0240727 A1 | 10/2006 | Price et al. | 442/59 |
| 2006/0240728 A1 | 10/2006 | Price et al. | 442/59 |
| 2006/0241287 A1 | 10/2006 | Hecht et al. | 530/356 |
| 2006/0289132 A1 | 12/2006 | Heijnesson-Hulten | |
| 2006/0289133 A1 | 12/2006 | Yeh et al. | |
| 2006/0289134 A1 | 12/2006 | Yeh et al. | |
| 2007/0131366 A1 | 6/2007 | Underhill et al. | |
| 2007/0224419 A1 | 9/2007 | Sumnicht et al. | |
| 2008/0054107 A1 | 3/2008 | Koslow et al. | |
| 2008/0057307 A1 | 3/2008 | Koslow et al. | |
| 2008/0083519 A1 | 4/2008 | Kokko et al. | |
| 2008/0105394 A1 | 5/2008 | Kokko | |
| 2008/0135193 A1 | 6/2008 | Kokko | |
| 2008/0173418 A1 | 7/2008 | Sumnicht et al. | |
| 2008/0173419 A1 | 7/2008 | Sumnicht et al. | |
| 2009/0020139 A1 | 1/2009 | Sumnicht et al. | |
| 2009/0020248 A1 | 1/2009 | Sumnicht et al. | |
| 2009/0065164 A1 | 3/2009 | Goto et al. | |
| 2009/0120598 A1 | 5/2009 | Edwards et al. | |
| 2009/0120599 A1 | 5/2009 | Nguyen | |
| 2009/0151881 A1 | 6/2009 | Nguyen | |
| 2009/0308551 A1 | 12/2009 | Kokko et al. | |
| 2010/0065235 A1 | 3/2010 | Fike et al. | |
| 2010/0212850 A1 | 8/2010 | Sumnicht et al. | |
| 2010/0272938 A1 | 10/2010 | Mitchell et al. | |
| 2010/0282423 A1 | 11/2010 | Super et al. | |
| 2010/0288456 A1 | 11/2010 | Westland et al. | |
| 2011/0011545 A1 | 1/2011 | Edwards et al. | |

FOREIGN PATENT DOCUMENTS

| | | | |
|---|---|---|---|
| GB | 978953 A1 | | 1/1965 |
| GB | 2412083 A1 | | 9/2005 |
| RU | 2127343 C1 | | 3/1999 |
| RU | 2144101 C1 | | 1/2000 |
| RU | 2183648 C2 | | 6/2002 |
| RU | 2328255 C2 | | 7/2008 |
| WO | 95/35399 A1 | | 12/1995 |
| WO | WO 98/03710 | * | 1/1998 |
| WO | 98/07914 A1 | | 2/1998 |
| WO | 20051010273 A1 | | 2/2005 |
| WO | 2007/109259 A2 | | 9/2007 |
| WO | 2009/038730 A1 | | 3/2009 |
| WO | 2009/038735 A1 | | 3/2009 |
| WO | 2010/033536 A2 | | 3/2010 |
| WO | 2010/065367 A1 | | 6/2010 |

OTHER PUBLICATIONS

Dymrose-Peterson, K., Smart Materials for Liquid Control, Nonwovens World, Oct.-Nov. 1999, pp. 95-99.

Gooding, R.W., Fractionation in a Bauer-McNett Classifier, Journal of Pulp and Paper Science, Dec. 2001, vol. 27, No. 12, pp. 423-428.

Imperato, G., et al., Low-Melting Sugar-Urea-Salt Mixtures as Solvents for Diels-Alder Reactions, Chem. Commun., 2005, pp. 1170-1172, Issue 9, RSC Publishing.

International Search Report and Written Opinion of the International Searching Authority for PCT/US07/06892 mailed Jun. 4, 2008.

International Search Report and Written Opinion of the International Searching Authority for PCT/US08/10840 mailed Dec. 1, 2008.

International Search Report and Written Opinion of the International Searching Authority for PCT/US08/10833 mailed Dec. 12, 2008.

International Search Report and Written Opinion of the International Searching Authority for PCT/US09/057078 mailed Feb. 7, 2010.

* cited by examiner

METHOD OF MAKING REGENERATED CELLULOSE MICROFIBERS AND ABSORBENT PRODUCTS INCORPORATING SAME

CROSS REFERENCE TO RELATED APPLICATIONS

This non-provisional application is based upon U.S. Provisional Patent Application Ser. No. 60/881,310, of the same title, filed Jan. 19, 2007; U.S. Provisional Patent Application Ser. No. 60/881,393, entitled "Absorbent Cellulosic Products With Regenerated Cellulose Formed In-Situ", filed Jan. 19, 2007; U.S. Provisional Patent Application Ser. No. 60/994,344, entitled "Absorbent Sheet Incorporating Regenerated Cellulose Microfiber", filed Sep. 19, 2007; and U.S. Provisional Patent Application Ser. No. 60/994,483, entitled "High Efficiency Disposable Cellulosic Wiper", filed Sep. 19, 2007. The priorities of U.S. Provisional Patent Application Ser. Nos. 60/881,310; 60/881,393; 60/994,344 and 60/994,483 are hereby claimed and the disclosures thereof are incorporated into this application by reference.

TECHNICAL FIELD

The present invention relates generally to making microfibers of regenerated cellulose and products incorporating such fibers. Microfibers of the invention are made by splitting larger fibers of regenerated cellulose in high yield to make microfibers suitable for incorporating into absorbent products, such as tissue. One preferred process utilizes ionic liquid/cellulose dopes. Products incorporating conventional papermaking fibers and microfibers of the invention exhibit high wet/dry CD tensile ratios.

BACKGROUND

Cellulose microfibers are described in U.S. Pat. No. 6,511,746 to Collier et al. In the '746 patent there is described a process for manufacturing cellulose microfibers from dissolved cellulose by extruding the dissolved cellulose (lyocell-type) through a converging die. The fibers are reported to have a diameter on the order of 10 µm with constituent structures of smaller diameters. See Col. 15-16. Note also, U.S. Pat. No. 6,235,392 to Luo et al. which describes melt blown Lyocell microfiber.

Lyocell is made by dissolving nearly pure cellulose in N-methyl-morpholine oxide (NMMO) and reforming fibers by injecting a concentrated cellulose/NMMO solution into a water bath through spinnerets. The water dilutes the NMMO as the nascent fiber is drawn through the bath, and the cellulose crystallizes into fibers. The fiber formation process first produces extremely fine fibrils which then align themselves along the axis of the fiber as the NMMO is removed. The strength of the bonds between fibrils has some distribution around a mean such that mechanical action may completely disintegrate some fibers while leaving others mostly intact. In most textile applications, fibrillation is not desired, and there are patents on ways to minimize fibrillation. In other applications such as filter media, it is desired to retain large fibers with fibrils still attached. In co-pending application U.S. Patent Application Ser. No. 60/850,467 (Case 20134), the lyocell is fibrillated to the point where fibrils are separated into distinct microfibers. FIG. 1 shows an example of fibrillated lyocell.

In the process of generating microfibers via fibrillated lyocell, a number of inefficiencies arise. First, lyocell has a tendency to fibrillate, but the manufacturer employs all means possible to minimize this tendency. Thus, an extended period of low intensity refining is necessary to gently tease the fibers apart. Too much mechanical action will grind and shorten the fibers rather than fibrillate them. Too little mechanical action will reduce the yield of microfibers. Current practice yields about half microfiber and half fibrillated fibers. It may be possible to separate the fractions with screening, but this adds cost. The larger fractions may or may not be readily splittable in any event.

A second inefficiency results from the morphology of the microfiber. Microfibers have extremely low coarseness and are very short. The benefits of microfiber such as bulk, softness, absorbency, wet strength, opacity, and the ability to reduce basis weight are documented in U.S. Patent Application Ser. No. 60/850,467, referred to above. Despite the many benefits of microfibers, it is believed that the tactile benefit and other properties could be improved by increasing the exceptionally low coarseness somewhat and increasing the average length of microfibers in accordance with the present invention.

A third inefficiency arising from conventional lyocell fiber manufacture relates to cost. Wood pulp is purified to alpha cellulose for current practice in order to produce high quality textile fibers. High purity cellulose adds cost. It may be possible and even desirable to use ordinary bleached Kraft pulp for some portion of the raw material. A 6 mm length can be cut on the production line, but shorter lengths require an offline process that adds still more cost. Fibrillation then produces microfibers while leaving some relatively unimpacted fibers. The microfibers so-produced have very low coarseness, but shorter than desired. The lightly impacted fibers are reasonably long, but coarseness is too high. The microfiber is the main desired product of fibrillation, yet the yield of microfiber from fibrillation is perhaps 50%, at best, using conventional techniques.

SUMMARY OF INVENTION

The invention relates, in part, to a modified method of producing underivatized cellulose fiber that provides a specific, "ideal" fiber length and coarseness for producing soft, yet strong, tissue and towel products. The method uses spinnerets capable of generating segmented fibers and cellulose dopes of slightly different composition to introduce fiber defects between segments of splittable fibers. Upon fibrillation, the fibers will preferentially break where the defects are introduced, resulting in the microfibers of the invention. The advantages of the invention over prior art relate, in part, to better yield of microfibers, up to 100% yield of microfiber based on the larger fiber split into microfiber. It is also possible to use lower cost raw materials, such as unpurified Kraft pulp or even recycle pulp, since impurities may enhance the ability of the splittable fibers to split into microfibers.

In one embodiment, there are formed lyocell fibers with dissimilar cellulose/NMMO solutions in a way that introduces designed defects into the fibers. The lyocell solutions can be made dissimilar in a number of ways, including but not limited to concentration, cellulose purity, or added chemicals. FIG. 2 provides an illustration of the concept. A bicomponent spinneret is used to extrude two slightly dissimilar solutions. The segments made from NMMO/alpha cellulose will be better formed and more resistant to fibrillation. The segments made from wood pulp will have defects from residual hemicellulose and will tend to fibrillate easier than high purity segments. Numerous other differences in composition between adjacent segments may be used to promote splitting;

for example, cellulose dopes with different degrees of polymerization of cellulose in the dope may be used in different fiber segments. Likewise, compositional differences may be introduced by using cellulose with differing pectin or other monosaccharide or polysaccharide content may be used. The final product after fibrillation may have a high number of relatively long, low-coarseness segments as well as microfibers.

In another embodiment, cellulose/ionic liquid solutions are similarly employed.

There is provided in one aspect of the invention a method of making microfibers of regenerated cellulose. The method involves: (a) preparing a first cellulosic dope having a first composition; (b) preparing a second cellulosic dope having a second composition which differs from the first composition of the first cellulosic dope; followed by (c) spinning, that is, extruding the first and second cellulosic dopes through suitable spinnerets into composite fibers each having a length and a segmented cross-section comprising a plurality of segments across the cross-section of the nascent fiber, the segments also extending along the length of the fiber and the nascent fibers include at least one longitudinally-extending segment formed from the first cellulosic dope juxtaposed with at least one longitudinally-extending segment formed from the second cellulosic dope. The nascent fibers are regenerated into splittable composite regenerated cellulose fibers each having a plurality of regenerated cellulose segments across the cross-section of the regenerated fiber. The segments also extend along the length of the fiber and include at least a first longitudinally-extending regenerated cellulose segment formed from the first cellulosic dope juxtaposed with at least a second longitudinally-extending regenerated cellulose segment formed from the second cellulosic dope, wherein the first longitudinally-extending regenerated cellulose segment is joined to the second longitudinally-extending regenerated cellulose segment along a splittable interface. Hollow segmented fibers are believed particularly suitable. The composite regenerated cellulose fibers are split into microfibers of smaller cross-section along the splittable interface between segments. The geometry of the nascent fibers is regulated, the first and second cellulosic dope compositions are selected and the steps of regenerating and splitting the fibers are controlled, such that the composite regenerated cellulose fibers are split into microfibers with a coarseness between 0.05 mg/100 m and 10 mg/100 m with a microfiber yield of more than 50% based on larger splittable regenerated cellulose composite fibers subjected to splitting. Preferably, the composite regenerated cellulose fibers are split into microfibers with a coarseness between 0.1 mg/100 m and 6 mg/100 m with a microfiber yield of more than 50% based on the larger splittable regenerated cellulose microfibers subjected to splitting. In some cases, the microfibers have a coarseness of less than 1 mg/100 m, less than 0.5 mg/100 m or less than 0.25 mg/100 m based on the product attribute desired.

So also, the composite regenerated cellulose fibers are split into microfibers with a length weighted average length between 0.1 mm and 10 mm, such as between 0.2 mm and 6 mm. Microfiber yields of more than 60%, more than 70% or more than 80% are readily achieved.

The first cellulosic dope may include dissolved cellulose at a first concentration when the second cellulosic dope comprises dissolved cellulose at a second concentration different from the first concentration of cellulose in the first cellulosic dope. In still other cases, the first cellulosic dope comprises dissolved cellulose of a first purity and the second cellulosic dope comprises dissolved cellulose of a second purity different from the first purity of the cellulose dissolved in the first dope. For example, one of the cellulosic dopes may include purified alpha cellulose and the second cellulosic dope may include dissolved Kraft pulp. In still other embodiments, one of the cellulosic dopes may include dissolved high yield pulp. In still yet other cases the first cellulosic dope has a constituent not present in the second cellulosic dope, such as a filler or lubricant. Alternatively, the first cellulosic dope has cellulose with a degree of polymerization which is different from that of cellulose in the cellulosic dope of the second composition.

Any suitable number of segments may be formed in the regenerated splittable composite regenerated cellulose fibers. For example, there may be two segments formed from the first cellulosic dope juxtaposed with two segments formed from the second cellulosic dope. Four, eight, or sixteen segments of each cellulosic dope may likewise be selected in the various embodiments of the present invention.

In one preferred embodiment at least one of the first and second cellulosic dopes includes cellulose dissolved in a solvent comprising N-methyl morpholine-N oxide (NMMO). In some cases both cellulosic dopes include cellulose dissolved in N-methyl morpholine-N oxide (NMMO).

In still other embodiments, at least one of the first and second cellulosic dopes includes cellulose dissolved in a solvent composition including an ionic liquid. In still other embodiments the first and second cellulosic dopes include cellulose dissolved in a solvent composition including an ionic liquid. A preferred ionic liquid is an imidazolium salt, such as 1-allyl-3-methylimidazolium chloride or other dialkylimidazolium salt. In some preferred embodiments, the first and second cellulosic dopes include the same ionic liquid.

Microfibers prepared in accordance with the present invention may be used to form absorbent sheet, such as tissue or towel products when mixed with other pulp-derived papermaking fibers. The pulp-derived papermaking fiber may be selected from Kraft hardwood fiber, Kraft softwood fiber, high yield fiber, recycled fibers and mixtures thereof.

Typical products have a basis weight of from about 5 lbs/3000 ft$^2$ ream to about 50 lbs/3000 ft$^2$ ream. In many cases the product will have a basis weight of from about 7.5 lbs/3000 ft$^2$ ream to about 35 lbs/3000 ft$^2$ ream. In some embodiments, sheet products may include from about 1 weight percent to about 30 weight percent of regenerated cellulose microfibers prepared in accordance with the invention. In other embodiments, high efficiency disposable cellulosic wipers include: (a) from about 90% by weight to about 25% by weight pulp-derived papermaking fiber having a characteristic scattering coefficient of less than 50 m$^2$/kg; and (b) from about 10% to about 75% by weight fibrillated regenerated cellulosic microfiber having a characteristic CSF value of less than 175 ml, the microfiber being selected and present in amounts such that the wiper exhibits a scattering coefficient of greater than 50 m$^2$/kg. Various ratios of pulp derived papermaking fiber to cellulose microfiber may be employed. For example the wiper may include from about 80 weight percent to a 30 weight percent pulp derived papermaking fiber and from about 20 weight percent to about 70 weight percent cellulose microfiber. Suitable ratios also include from about 70 percent by weight papermaking fiber to about 35 percent by weight pulp derived papermaking fiber and from about 30 percent by weight to about 65 percent by weight cellulose microfiber. Likewise, 60 percent to 40 percent by weight pulp derived papermaking fiber may be used with 40 percent by weight to about 60 percent by weight cellulose microfiber. The microfiber is further characterized in some cases in that the fiber is 40 percent by weight finer than 14 mesh. In other cases the microfiber may be characterized in that at least 50, 60, 70 or 80 percent by weight of the fibrillated regenerated cellulose microfiber is finer than 14 mesh. So also, the microfiber may have a number average diameter of less than about 2 microns, suitably between about 0.1 and about 2 microns. Thus the regenerated cellulose microfiber may have a fiber count of greater than 50 million fibers/gram or greater than 400 million fibers/gram. A suitable regenerated cellulose microfiber has a weight average diameter of less than 2 microns, a weight average length of less than 500 microns, and a fiber count of greater than 400 million fibers/gram such as a weight average diameter of less than 1 micron, a weight average length of less than 400 microns and a fiber count of greater than 2 billion fibers/gram. In still other cases the regenerated cellulose microfiber has a weight average diameter of less than 0.5 microns, a weight average length of less than 300 microns and a fiber count of greater than 10 billion fibers/gram. In another embodiment, the fibrillated regenerated cellulose microfiber has a weight average diameter of less than 0.25 microns, a weight average length of less than 200 microns and a fiber count of greater than 50 billion fibers/gram. Alternatively the fibrillated regenerated cellulose microfiber may have a fiber count of greater than 200 billion fibers/gram and/or a coarseness value of less than about 0.5 mg/100 m. A coarseness value for the regenerated cellulose microfiber may be from about 0.001 mg/100 m to about 0.2 mg/100 m. Preferably the sheet exhibits a wet/dry tensile ratio of greater than 30%, such as a wet/dry CD tensile ratio of between about 35% and about 60%. A wet/dry CD tensile ratio of at least about 40% or at least about 45% is preferred in many cases.

Further details and aspects of the present invention are described in more detail below.

BRIEF DESCRIPTION OF DRAWINGS

The invention is described with reference to the drawings, wherein.

DETAILED DESCRIPTION

Figure 1:
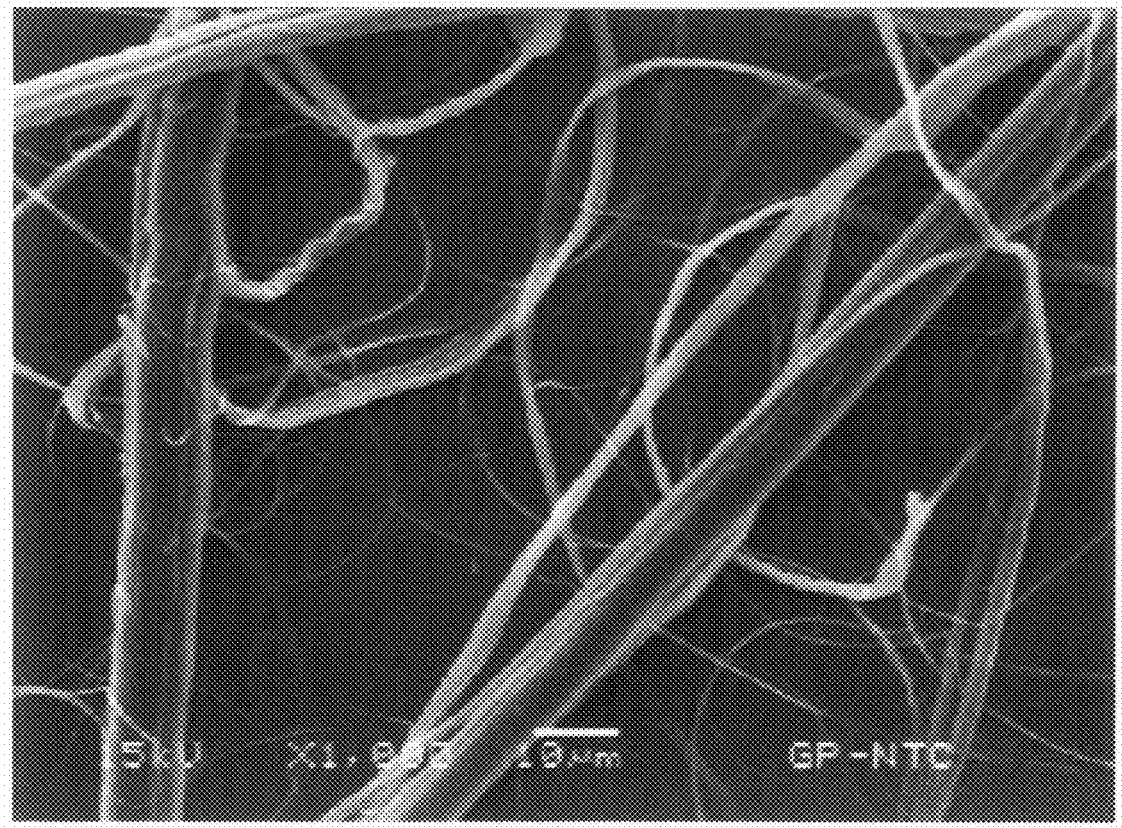
FIG. 1 is a photomicrograph 100× of 14 mesh refined lyocell fiber.

The invention is described in detail below with reference to several embodiments. Such discussion is for purposes of illustration only.

Terminology used herein is given its ordinary meaning consistent with the exemplary definitions set forth immediately below; mg refers to milligrams and $m^2$ refers to square meters, mBar means milliBar (1/1000 Bar) and so forth. Unless otherwise specified, % means weight percent.

Unless otherwise specified, "basis weight", BWT, bwt and so forth refers to the weight of a 3000 square foot ream of product.

The term "cellulosic", "cellulosic sheet" and the like is meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs when mixed with microfibers of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers used in connection with the furnish blends of this invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc. The pulp can be bleached if desired by chemical means including the use of chlorine, chlorine dioxide, oxygen, alkaline peroxide and so forth. Naturally occurring pulp-derived fibers are referred to herein simply as "pulp-derived" papermaking fibers. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including microfibers of this invention, papermaking fibers, optionally wet strength resins, debonders and the like for making paper products. The papermaking fibers are in many embodiments Kraft fibers, described below.

Kraft softwood fiber is low yield fiber made by the well known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus, and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

"Cellulosic dope" means a viscous solution of dissolved cellulose. Preferably, the cellulose is underivatized to ease processing. "Underivatized" cellulose refers to cellulose which has not been substantially derivatized, for example, esterified or xanthated as occurs in a cellulose acetate process or a viscose process. "Connatural" saccharide content refers to the content of saccharide units in the cellulosic dope other than D-glucose saccharide building blocks, based on the total saccharide content of the dope. For example, a cellulosic dope having 99.5% alpha-cellulose and 0.5% hemicellulose made up of xylose units and other non-glucose units on a dry basis, has a connatural saccharide content of 0.5%.

Fiber length and coarseness can be measured using a fiber-measuring instrument such as the Kajaani FS-200 analyzer available from Valmet Automation of Norcross, Ga. or an OPTEST FQA. For fiber length measurements, a dilute suspension of the fibers (approximately 0.5 to 0.6 percent) whose length is to be measured may be prepared in a sample beaker and the instrument operated according to the procedures recommended by the manufacturer. The report range for fiber lengths is set at an instrument's minimum value of, for example, 0.07 mm and a maximum value of, for example, 7.2 mm; fibers having lengths outside of the selected range are excluded. Three calculated average fiber lengths may be reported. The arithmetic average length is the sum of the product of the number of fibers measured and the length of the fiber divided by the sum of the number of fibers measured. The length-weighted average fiber length is defined as the sum of the product of the number of fibers measured and the length of each fiber squared divided by the sum of the product of the number of fibers measured and the length the fiber. The weight-weighted average fiber length is defined as the sum of the product of the number of fibers measured and the length of the fiber cubed divided by the sum of the product of the number of fibers and the length of the fiber squared. For microfibers, it is sometimes necessary to use other optical techniques or simply calculate fiber parameters based on geometry and starting material configuration. For example, if a sample of larger fibers having 16 segments was uniformly split in 100% yield by visual observation, the microfiber diameter and coarseness is approximately 1/16 that of the starting material.

Fiber coarseness is the weight of fibers in a sample per a given length and is usually reported as mg/100 meters. Coarseness, C, is expressed in mg/100 m as follows:

$$C = 10^5 \times \frac{sampleweight}{\sum_{all\ fibers} n_i L_i}$$

"Denier" is a measure of fiber or filament coarseness and is in units of g/9000 m unless otherwise indicated.

Freezing point depressions of compositions are determined by calculating the melting point by rule of mixtures and subtracting the observed melting point of the composition.

"Fiber" means an elongated fibrous structure, typically having an aspect (length/diameter) ratio of 3 or more.

"Microfiber" means fibers having a coarseness of 10 mg/100 m or less.

"Microfiber yield" is expressed in percent based on material subjected to splitting. For example, a 100 gram sample of splittable fibers having a coarseness of 200 yielding 85 grams of microfiber having a coarseness of 5 has a microfiber yield of 85%. Microfiber yield may refer to a specific product coarseness or length as well. For example, a microfiber yield of 85% based on coarseness where only 75% of the microfibers were of the desired length would be a yield of (85%) (0.75) or 63.75% of microfibers of the desired coarseness and length.

Dry tensile strengths (MD and CD), stretch, ratios thereof, modulus, break modulus, stress and strain are measured with a standard Instron test device or other suitable elongation tensile tester which may be configured in various ways, typically using 3 or 1 inch wide strips of tissue or towel, conditioned in an atmosphere of 23°±1° C. (73.4°±1° F.) at 50% relative humidity for 2 hours. The tensile test is run at a crosshead speed of 2 in/min. Tensile strength is sometimes referred to simply as "tensile" and is reported in breaking length (km), g/3" or g/in.

The wet tensile of the tissue of the present invention is measured using a three-inch wide strip of tissue that is folded into a loop, clamped in a special fixture termed a Finch Cup, then immersed in water. The Finch Cup, which is available from the Thwing-Albert Instrument Company of Philadelphia, Pa., is mounted onto a tensile tester equipped with a 2.0 pound load cell with the flange of the Finch Cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time. Values are divided by two, as appropriate, to account for the loop.

Wet/dry tensile ratios are expressed in percent by multiplying the ratio by 100. For towel products, the wet/dry CD tensile ratio is the most relevant. Throughout this specification and claims which follow "wet/dry ratio" or like terminology refers to the wet/dry CD tensile ratio unless clearly specified otherwise. For handsheets, MD and CD values are approximately equivalent.

Regenerated cellulose fiber-forming techniques are well known in the art. Composite filaments of cellulose are disclosed in U.S. Pat. No. 2,428,046 to Sisson et al. In this patent, there is described a method of spinning a fiber from two different cellulosic dopes through a spinneret in order to provide composite fibers of regenerated cellulose. See FIGS. 8 and 9 of the '046 patent. Note also, U.S. Pat. No. 2,440,761 also to Sisson et al. Further details with respect to co-extrusion of cellulosic dopes to form structures are found in the following United States patents: U.S. Pat. No. 3,175,339 to McDowell; U.S. Pat. No. 4,267,047 to Henne et al.; and U.S. Pat. No. 4,802,942 to Takemura et al. The disclosures of U.S. Pat. Nos. 2,428,046; 2,440,761; 3,175,339; 4,267,047; and 4,802,942 are incorporated herein by reference.

Segmented fiber preparation for making splittable fibers is known in connection with thermoplastic fibers, where fibers having segments formed of different polymers. See, for example U.S. Pat. No. 5,759,926 to Pike et al., as well as U.S. Pat. No. 5,895,710 to Sasse et al. and United States Patent Application Publication No. 2003/0203695 (U.S. patent application Ser. No. 10/135,650) of Polanco et al., the disclosures of which are incorporated herein by reference.

The splittable fibers produced and utilized in accordance with this invention may have a segmented pie shape, an island in the sea configuration, a side-by-side configuration and so forth. See U.S. Pat. No. 4,735,849 to Murakami et al., FIGS. 6A-6D, as well as United States Patent Application Publication No. 2002/0168912 (Ser. No. 09/852,888), FIGS. 2-9. The disclosures of U.S. Pat. No. 4,735,849 and Publication No. US 2002/0168912 are incorporated herein by reference in their entireties.

In connection with the present invention, the regenerated cellulose splittable fibers may have a denier of around 2, which equates to a coarseness of 22 mg/100 m, similar to southern softwood Kraft fibers. Each wedge of a 16-segment fiber would have a coarseness of 1.4 mg/100 m, and a 32-segment fiber would have wedges with a coarseness of 0.7 mg/100 m. For comparison, eucalyptus fibers employed for the softest tissue grades have a coarseness around 6 mg/100 m.

The solvent composition for dissolving cellulose and preparing underivatized cellulose dopes suitably includes tertiary amine oxides such as N-methylmorpholine-N-oxide (NMMO) and similar compounds enumerated in U.S. Pat. No. 4,246,221 to McCorsley, the disclosure of which is incorporated herein by reference. Cellulose dopes may contain non-solvents for cellulose such as water, alkanols or other solvents as will be appreciated from the discussion which follows.

Suitable cellulosic dopes are enumerated in Table 1, below.

TABLE 1

EXAMPLES OF TERTIARY AMINE N-OXIDE SOLVENTS

| Tertiary Amine N-oxide | % water | % cellulose |
|---|---|---|
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also, U.S. Pat. No. 3,508,945 to Johnson, the disclosure of which is incorporated herein by reference.

Throughout the specification and claims, where referring to one composition as differing from another, it is meant that the two compositions differ in concentration, or differ in chemical composition, or differ in connatural saccharide content, or differ in degree of polymerization, or differ in two or more of these features. It is not necessary that the cellulosic dopes have a different chemical make-up because a difference in molecular weights (i.e., average degree of polymerization) of the dissolved cellulose of the two dopes may suffice to facilitate formation of a splittable interface between fiber segments. Likewise, complex saccharides other than alpha-cellulose present in different amounts can provide the necessary differences between cellulosic dopes.

Cellulose is a naturally-occurring polymer of D-glucose with a 1,4β linkage with a typical degree of polymerization of anywhere from about 2,000-15,000; most commonly from about 10,000-14,000 according to many reported values; however, the degree of polymerization of cellulose may be reduced when extracted from its source. The change in degree of polymerization may be different depending upon the severity of the extraction procedure.

Purified cellulose (β-linked poly(glucopyranose)) compositions are referred to as alpha cellulose. Wood pulp generally contains higher levels of hemicellulose than alpha cellulose preparations as noted above. Hemicelluloses extracted from different plants are rarely identical and include different molecular types with different degrees of polymerization. In many cases, hemicellulose includes predominantly D-xylose building blocks, and may include arabinose units, galactose units and so forth. Optionally present in the cellulose preparation are complex polysaccharides such as arabinoxylan and/or arabinogalactan at significant levels. Thus, one way of preparing cellulose dopes with different compositions is to employ cellulose sources having different levels of particular saccharides other than D-glucose repeat units; for example, by using natural cellulose from different sources.

Details with respect to preparation of cellulosic dopes including cellulose dissolved in suitable ionic liquids and cellulose regeneration therefrom are found in U.S. patent application Ser. No. 10/256,521; Publication No. US 2003/0157351 of Swatloski et al. entitled "Dissolution and Processing of Cellulose Using Ionic Liquids", the disclosure of which is incorporated herein by reference. Here again, suitable levels of non-solvents for cellulose may be included. There is described generally in this patent application a process for dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations such as the following cations: imidazolium; pyridinum; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Processing techniques for ionic liquids/cellulose dopes are also discussed in U.S. Pat. No. 6,808,557 to Holbrey et al., entitled "Cellulose Matrix Encapsulation and Method", the disclosure of which is incorporated herein by reference. Note also, U.S. patent application Ser. No. 11/087,496; Publication No. 2005/0288484 of Holbrey et al., entitled "Polymer Dissolution and Blend Formation in Ionic Liquids", as well as U.S. patent application Ser. No. 10/394,989; Publication No. 2004/0038031 of Holbrey et al., entitled "Cellulose Matrix Encapsulation and Method", the disclosures of which are incorporated herein by reference. With respect to ionic fluids in general the following documents provide further detail: U.S. patent application Ser. No. 11/406,620, Publication No. 2006/0241287 of Hecht et al., entitled "Extracting Biopolymers From a Biomass Using Ionic Liquids"; U.S. patent application Ser. No. 11/472,724, Publication No. 2006/0240727 of Price et al., entitled "Ionic Liquid Based Products and Method of Using The Same"; U.S. patent application Ser. No. 11/472,729; Publication No. 2006/0240728 of Price et al., entitled "Ionic Liquid Based Products and Method of Using the Same"; U.S. patent application Ser. No. 11/263,391, Publication No. 2006/0090271 of Price et al., entitled "Processes For Modifying Textiles Using Ionic Liquids"; and U.S. patent application Ser. No. 11/375,963 of Amano et al. (Publication No. 2006/0207722), the disclosures of which are incorporated herein by reference. Some ionic liquids and quasi-ionic liquids which may be suitable are disclosed by Konig et al., Chem. Commun. 2005, 1170-1172, the disclosure of which is incorporated herein by reference.

"Ionic liquid", refers to a molten composition including an ionic compound that is preferably a stable liquid at temperatures of less than 100° C. at ambient pressure. Typically, such liquids have very low vapor pressure at 100° C., less than 75 mbar or so and preferably less than 50 mBar or 25 in Bar at 100° C. Most suitable liquids will have a vapor pressure of less than 10 mBar at 100° C. and often the vapor pressure is so low it is negligible and is not easily measurable since it is less than 1 mBar at 100° C.

Suitable commercially available ionic liquids are Basionic™ ionic liquid products available from BASF (Florham Park, N.J.) and are listed in Table 2 below.

TABLE 2

Exemplary Ionic Liquids

| IL Abbreviation | Basionic™ Grade | Product name | CAS Number |
|---|---|---|---|
| STANDARD | | | |
| EMIM Cl | ST 80 | 1-Ethyl-3-methylimidazolium chloride | 65039-09-0 |
| EMIM CH$_3$SO$_3$ | ST 35 | 1-Ethyl-3-methylimidazolium methanesulfonate | 145022-45-3 |
| BMIM Cl | ST 70 | 1-Butyl-3-methylimidazolium chloride | 79917-90-1 |
| BMIM CH$_3$SO$_3$ | ST 78 | 1-Butyl-3-methylimidazolium methanesulfonate | 342789-81-5 |
| MTBS | ST 62 | Methyl-tri-n-butylammonium methylsulfate | 13106-24-6 |
| MMMPZ MeOSO$_3$ | ST 33 | 1,2,4-Trimethylpyrazolium methylsulfate | |
| EMMIM EtOSO$_3$ | ST 67 | 1-Ethyl-2,3-di-methylimidazolium ethylsulfate | 516474-08-01 |
| MMMIM MeOSO$_3$ | ST 99 | 1,2,3-Trimethyl-imidazolium methylsulfate | 65086-12-6 |
| ACIDIC | | | |
| HMIM Cl | AC 75 | Methylimidazolium chloride | 35487-17-3 |
| HMIM HSO$_4$ | AC 39 | Methylimidazolium hydrogensulfate | 681281-87-8 |
| EMIM HSO$_4$ | AC 25 | 1-Ethyl-3-methylimidazolium hydrogensulfate | 412009-61-1 |
| EMIM AlCl$_4$ | AC 09 | 1-Ethyl-3-methylimidazolium tetrachloroaluminate | 80432-05-9 |
| BMIM HSO$_4$</ | AC 28 | 1-Butyl-3-methylimidazolium hydrogensulfate | 262297-13-2 |
| BMIM AlCl$_4$ | AC 01 | 1-Butyl-3-methylimidazolium tetrachloroaluminate | 80432-09-3 |
| BASIC | | | |
| EMIM Acetat | BC 01 | 1-Ethyl-3-methylimidazolium acetate | 143314-17-4 |
| BMIM Acetat | BC 02 | 1-Butyl-3-methylimidazolium acetate | 284049-75-8 |
| LIQUID AT RT | | | |
| EMIM EtOSO$_3$ | LQ 01 | 1-Ethyl-3-methylimidazolium ethylsulfate | 342573-75-5 |
| BMIM MeOSO$_3$ | LQ 02 | 1-Butyl-3-methylimidazolium methylsulfate | 401788-98-5 |
| LOW VISCOSITY | | | |
| EMIM SCN | VS 01 | 1-Ethyl-3-methylimidazolium thiocyanate | 331717-63-6 |
| BMIM SCN | VS 02 | 1-Butyl-3-methylimidazolium thiocyanate | 344790-87-0 |
| FUNCTIONALIZED | | | |
| COL Acetate | FS 85 | Choline acetate | 14586-35-7 |
| COL Salicylate | FS 65 | Choline salicylate | 2016-36-6 |
| MTEOA MeOSO$_3$ | FS 01 | Tris-(2-hydroxyethyl)-methylammonium methylsulfate | 29463-06-7 |

Cellulose dopes including ionic liquids having dissolved therein about 5% by weight underivatized cellulose are commercially available from Aldrich. These compositions utilize alkyl-methylimidazolium acetate as the solvent. It has been found that choline-based ionic liquids are not particularly suitable for dissolving cellulose.

In accordance with the invention, ionic liquids are used to dissolve cellulose. 1-allyl-3-methylimidazolium chloride for example, may be employed. The cellulose in an ionic liquid solution is precipitated by diluting the solution with water. It is this characteristic that is used to create novel fiber structures of the present invention.

Figure 2:
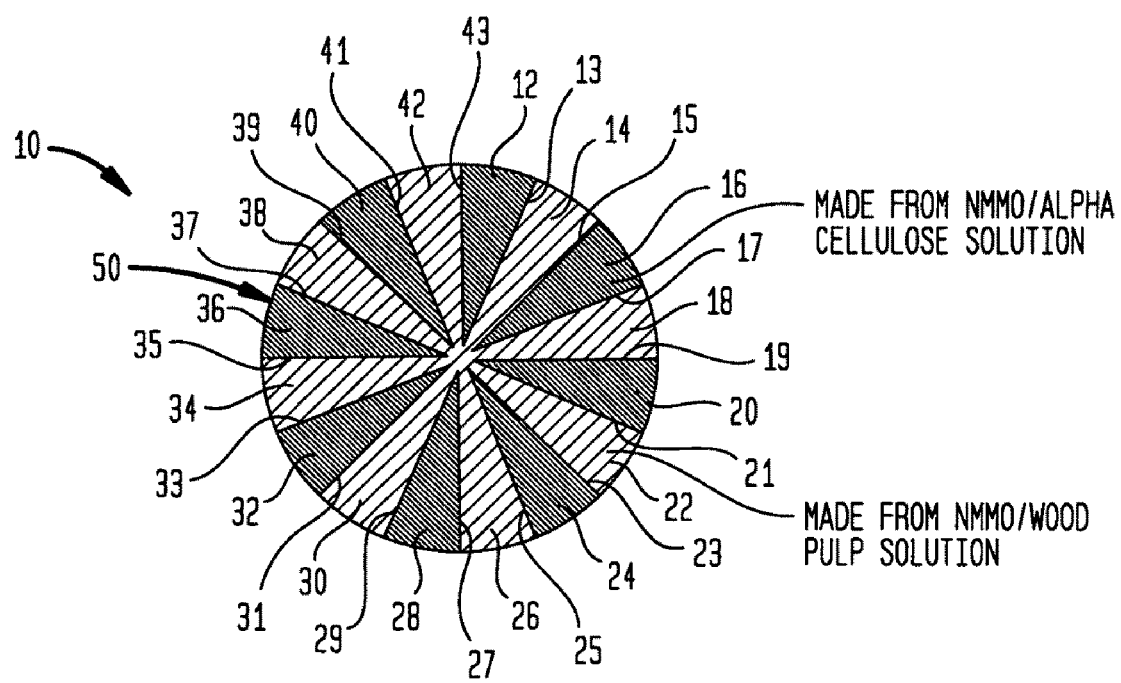
FIG. 2 is a schematic diagram of a cross section of a splittable regenerated cellulose fiber of the invention.
Figure 3:
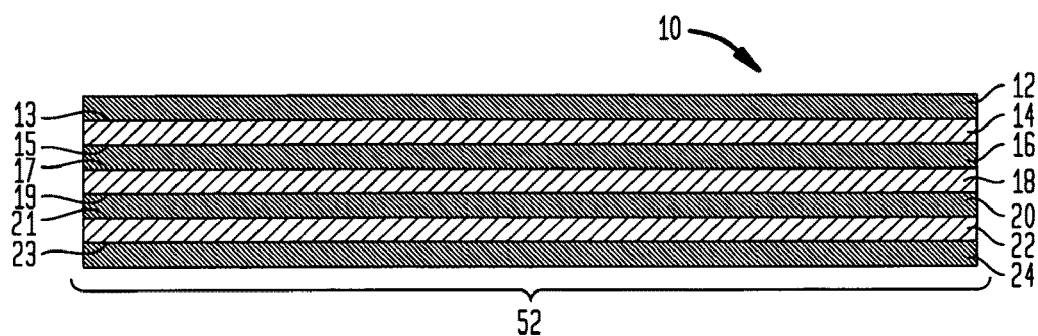
FIG. 3 is a schematic view along the length of the fiber of FIG. 2.

There is shown in FIGS. 2 and 3 a splittable composite regenerated cellulose fiber 10 having a plurality of regenerated cellulose segments 12, 14, 16, 18, 20, 22, 24, 26, 28, 30, 32, 34, 36, 38, 40, 42 across a cross-section 50 of the regenerated fiber. The segments also extend along the entire (or substantially the entire) length 52 of the fiber and include at least a first longitudinally-extending regenerated cellulose segment 12 formed from a first cellulosic dope juxtaposed with at least a second longitudinally-extending regenerated cellulose segment 14 formed from a second cellulosic dope, wherein the first longitudinally-extending regenerated cellulose segment is joined to the second longitudinally-extending regenerated cellulose segment along a splittable interface 13. To this end, the first and second cellulosic dopes are selected such that fiber 10 is readily splittable into its constituent segments. In the embodiment shown in FIGS. 1 and 2, segments 12, 16, 20, 24, 28, 32, 36 and 40 are formed from a first cellulosic dope having a first composition and segments 14, 18, 22, 26, 30, 34, 38 and 42 are formed from a second cellulosic dope having a second composition. Segments of different composition are thus splittably joined at interfaces 13, 15, 17, 19, 21, 23, 25, 27, 29, 31, 33, 35, 37, 39, 41 and 43.

Figure 4:
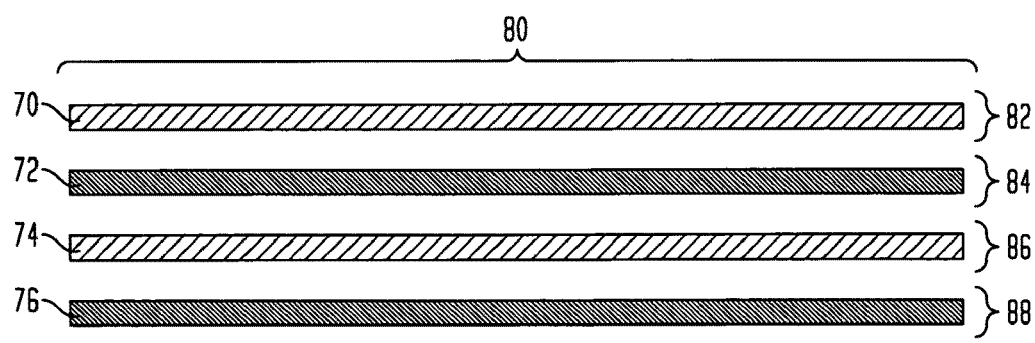
FIG. 4 is a schematic view of regenerated cellulose microfibers made from splittable regenerated cellulose fiber of FIGS. 2 and 3.

Following formation, fibers or regenerated cellulose such as fiber 10 are split at interfaces 13, 15, 17, 19, 21, 23, 25, 27, 29, 31, 33, 35, 37, 39, 41 and 43 by refining or any other suitable technique into microfibers such as microfibers 70, 72, 74 and 76 and so forth as shown schematically in FIG. 4. Fibers 70, 72, 74 and 76 may have a length 80 which is similar to, or, more typically, shorter than length 52 of the large fibers from which they are made; however, the diameters 82, 84, 86, 88 of fibers 70-76 correspond to the segment cross sections, such as segments 12-42 from which the microfibers were split.

Length 80 of the microfibers may be substantially smaller, on average, than the length of the larger fibers from which they are made, if so desired. A length weighted average length of from about 20% to about 50% of the larger fibers may be achieved. Generally, the microfibers are split from larger fibers into microfibers having a length distribution and a coarseness distribution influenced by segment geometry and composition of the larger splittable fibers from which they are made.

Figure 5:
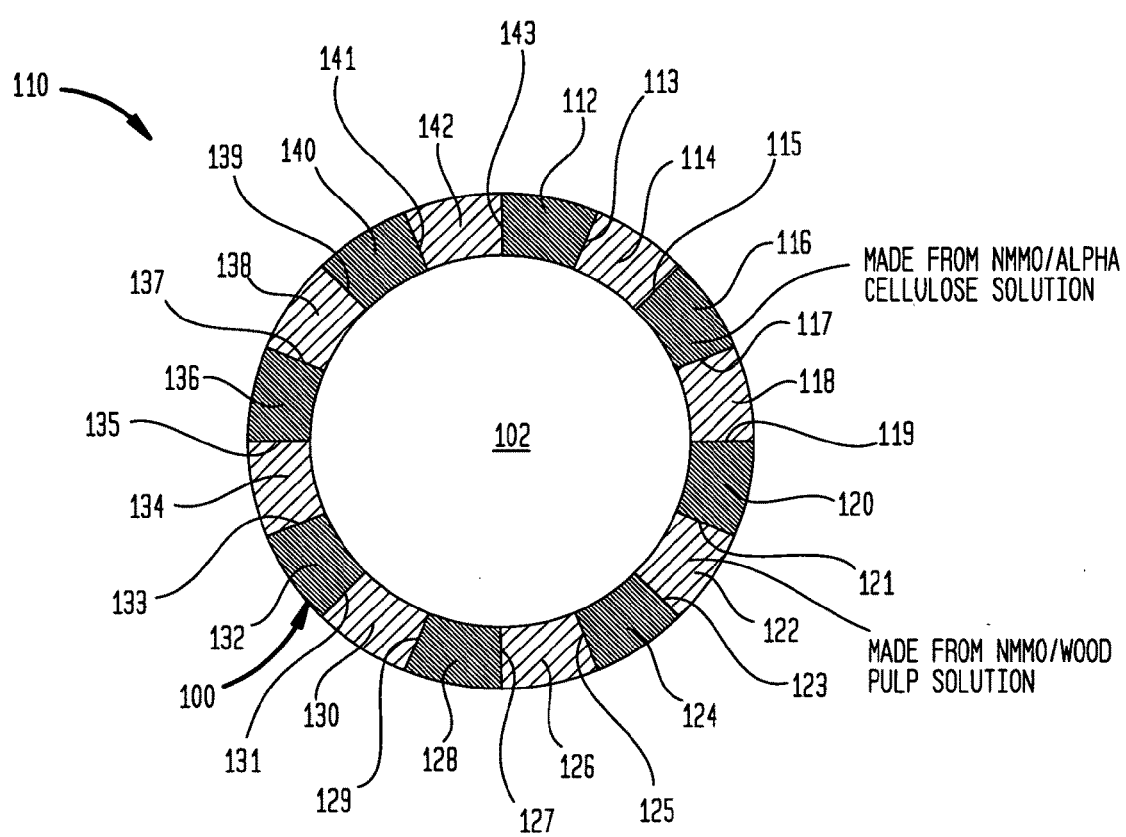
FIG. 5 is a schematic diagram of a cross section of a hollow splittable regenerated cellulose fiber of the invention.

There is shown in FIG. 5 a splittable composite regenerated cellulose hollow fiber 110 in cross section provided with a cylindrically shaped, annular shell 100 extending along its length about a hollow core 102. Shell 100 has a plurality of regenerated cellulose segments 112, 114, 116, 118, 120, 122, 124, 126, 128, 130, 132, 134, 136, 138, 140, 142 around annular shell 100 as shown. The segments also optionally extend along the entire (or substantially the entire) length of the fiber and include at least a first longitudinally-extending regenerated cellulose segment 112 formed from a first cellulosic dope juxtaposed with at least a second longitudinally-extending regenerated cellulose segment 114 formed from a second cellulosic dope, wherein the first longitudinally-extending regenerated cellulose segment is joined to the second longitudinally-extending regenerated cellulose segment along a splittable interface 113. To this end, the first and second cellulosic dopes are selected such that fiber 110 is readily splittable into its constituent segments as was described above in connection with composite fiber 10. In the embodiment shown in FIG. 5, segments 112, 116, 120, 124, 128, 132, 136 and 140 are formed from a first cellulosic dope having a first composition and segments 114, 118, 122, 126, 130, 134, 138 and 142 are formed from a second cellulosic dope having a second composition. Segments of different composition are thus splittably joined at interfaces 113, 115, 117, 119, 121, 123, 125, 127, 129, 131, 133, 135, 137, 139, 141 and 143. Following formation, fiber 110 is split into microfibers along these interfaces corresponding to the various segments around shell 100 as described above in connection with splittable fiber 10 to produce microfibers as shown in FIG. 4.

Microfibers shown schematically in FIG. 4 are mixed with pulp-derived papermaking fibers in an aqueous furnish and formed into absorbent sheet. Methods of making paper tissue, towel, and the like are well known, including various features such as Yankee drying, throughdrying, fabric creping, dry creping, wet creping and so forth. Conventional wet pressing/dry creping processes (CWP) have certain advantages over conventional through-air drying processes including: (1) lower energy costs associated with the mechanical removal of water rather than transpiration drying with hot air; and (2) higher production speeds which are more readily achieved with processes which utilize wet pressing to form a web. On the other hand, through-air drying processing has been widely adopted for new capital investment, particularly for the production of soft, bulky, premium quality tissue and towel products.

Throughdried, creped products and processes (TAD) are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer. A relatively permeable web is typically required, making it difficult to employ recycle furnish at levels which may be desired. Transfer to the Yankee typically takes place at web consistencies of from about 60% to about 70%. See also, U.S. Pat. No. 6,187,137 to Druecke et al. which includes disclosure of peeling a web from a Yankee dryer. Uncreped, throughdried products are described in U.S. Pat. No. 5,607,551 to Farrington, Jr. et al., the disclosure of which is incorporated herein by reference.

Some newer processes including fabric-creping and the use of creping adhesives are described in the following co-pending applications: U.S. patent application Ser. No. 11/804,246, filed May 16, 2007, entitled "Fabric Creped Absorbent Sheet with Variable Local Basis Weight"; U.S. patent application Ser. No. 11/678,669, entitled "Method of Controlling Adhesive Build-Up on a Yankee Dryer"; U.S. patent application Ser. No. 11/451,112 (Publication No. 2006/0289133), filed Jun. 12, 2006, entitled "Fabric-Creped Sheet for Dispensers"; U.S. Ser. No. 11/451,111, filed Jun. 12, 2006 (Publication No. 2006/0289134), entitled "Method of Making Fabric-creped Sheet for Dispensers"; U.S. patent application Ser. No. 11/402,609 (Publication No. 2006/0237154), filed Apr. 12, 2006, entitled "Multi-Ply Paper Towel With Absorbent Core"; U.S. patent application Ser. No. 11/151,761, filed Jun. 14, 2005 (Publication No. 2005/0279471), entitled "High Solids Fabric-crepe Process for Producing Absorbent Sheet with In-Fabric Drying"; U.S. application Ser. No. 11/108,458, filed Apr. 18, 2005 (Publication No. 2005/0241787), entitled "Fabric-Crepe and In Fabric Drying Process for Producing Absorbent Sheet"; U.S. application Ser. No. 11/108,375, filed Apr. 18, 2005 (Publication No. 2005/0217814), entitled "Fabric-crepe/Draw Process for Producing Absorbent Sheet"; U.S. application Ser. No. 11/104,014, filed Apr. 12, 2005 (Publication No. 2005/0241786), entitled "Wet-Pressed Tissue and Towel Products With Elevated CD Stretch and Low Tensile Ratios Made With a High Solids Fabric-Crepe Process"; U.S. application Ser. No. 10/679,862 (Publication No. 2004/0238135), filed Oct. 6, 2003, entitled "Fabric-crepe Process for Making Absorbent Sheet"; U.S. Provisional Patent Application Ser. No. 60/903,789, filed Feb. 27, 2007, entitled "Fabric Crepe Process With Prolonged Production Cycle". The applications referred to immediately above are particularly relevant to the selection of machinery, materials, processing conditions and so forth as to fabric creped products of the present invention and the disclosures of these applications are incorporated herein by reference.

While the invention has been described in detail, modifications within the spirit and scope of the invention will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary.

What is claimed is:

1. A method of making microfibers of regenerated cellulose comprising:
   a) preparing a first cellulosic dope having a first composition;
   b) preparing a second cellulosic dope having a second composition which differs from the first composition of the first cellulosic dope;
   c) spinning the first and second cellulosic dopes into composite nascent fibers each having a length and a segmented cross-section comprising a plurality of segments across the cross-section of the nascent fiber, the segments also extending along the length of the fiber and the nascent fibers including at least one longitudinally-extending segment formed from the first cellulosic dope juxtaposed with at least one longitudinally-extending segment formed from the second cellulosic dope;
   d) regenerating the nascent fibers to splittable composite regenerated cellulose fibers each having a plurality of regenerated cellulose segments across the cross section of the regenerated fiber, the segments also extending along the length of the fiber and including at least a first longitudinally-extending regenerated cellulose segment formed from the first cellulosic dope juxtaposed with at least a second longitudinally-extending regenerated cellulose segment formed from the second cellulosic dope, wherein the first longitudinally-extending regenerated cellulose segment is joined to the second longitudinally-extending regenerated cellulose segment along a splittable interface; and
   e) splitting the composite regenerated cellulose fibers into microfibers of smaller cross-section along the splittable interface between segments,
   wherein the geometry of the nascent fibers is regulated, the first and second cellulosic dope compositions are cellulosic dopes without other fiber-forming components, and are selected, and the steps of regenerating and splitting the fibers are controlled, such that the composite regenerated cellulose fibers are split into micro fibers with a coarseness between 0.05 mg/100 m and 10 mg/100 m with a microfiber yield of more than 50% based on larger splittable regenerated cellulose composite fibers subjected to step (e) and said microfibers have a length weighted average length of from about 20% to about 50% of said larger splittable regenerated cellulose composite fibers.

2. The method according to claim 1, wherein the composite regenerated cellulose fibers are split into microfibers with coarseness between 0.1 mg/100 m and 6 mg/100 m with a microfiber yield of more than 50% based on larger splittable regenerated cellulose composite fibers subjected to step (e).

3. The method according to claim 2, wherein the composite regenerated cellulose fibers are split into microfibers with coarseness less than 1 mg/100 m with a microfiber yield of more than 50% based on larger splittable regenerated cellulose composite fibers subjected to step (e).

4. The method according to claim 2, wherein the composite regenerated cellulose fibers are split into microfibers with coarseness less than 0.5 mg/100 m with a microfiber yield of more than 50% based on larger splittable regenerated cellulose composite fibers subjected to step (e).

5. The method according to claim 2, wherein the composite regenerated cellulose fibers are split into microfibers with coarseness less than 0.25 mg/100 m with a microfiber yield of more than 50% based on larger splittable regenerated cellulose composite fibers subjected to step (e).

6. The method according to claim 1, wherein the composite regenerated cellulose fibers are split into microfibers with a length weighted average length between 0.1 mm and 10 mm.

7. The method according to claim 1, wherein the composite regenerated cellulose fibers are split into microfibers with a length weighted average length between 0.2 mm and 6 mm.

8. The method according to claim 1, wherein the geometry of the nascent fibers is regulated, the first and second cellulosic dope compositions are selected, and the steps of regenerating and splitting the fibers are controlled, such that the composite regenerated cellulose fibers are split into microfibers with a coarseness between 0.05 mg/100 m and 10 mg/100 m with a microfiber yield of more than 60% based on larger splittable regenerated cellulose composite fibers subjected to step (e).

9. The method according to claim 1, wherein the geometry of the nascent fibers is regulated, the first and second cellulosic dope compositions are selected, and the steps of regenerating and splitting the fibers are controlled, such that the composite regenerated cellulose fibers are split into microfibers with a coarseness between 0.05 mg/100 m and 10 mg/100 m with a microfiber yield of more than 70% based on larger splittable regenerated cellulose composite fibers subjected to step (e).

10. The method according to claim 1, wherein the geometry of the nascent fibers is regulated, the first and second cellulosic dope compositions are selected, and the steps of regenerating and splitting the fibers are controlled, such that the composite regenerated cellulose fibers are split into microfibers with a coarseness between 0.05 mg/100 m and 10 mg/100 m with a microfiber yield of more than 80% based on larger splittable regenerated cellulose composite fibers subjected to step (e).

11. The method according to claim 1, wherein the first cellulosic dope comprises dissolved cellulose at a first concentration and the second cellulosic dope comprises dissolved cellulose at a second concentration different from the first concentration of cellulose in the first cellulosic dope.

12. The method according to claim 1, wherein the first cellulosic dope comprises dissolved cellulose of a first purity and the second cellulosic dope comprises dissolved cellulose of a second purity different from the first purity of the cellulose dissolved in the first dope.

13. The method according to claim 12, wherein at least one of the cellulosic dopes comprises purified alpha-cellulose and at least one of the cellulosic dopes comprises dissolved Kraft pulp.

14. The method according to claim 12, wherein at least one of the cellulosic dopes comprises dissolved high yield pulp.

15. The method according to claim 1, wherein the first cellulosic dope contains dissolved cellulose having a first average degree of polymerization different from a second average degree of polymerization of dissolved cellulose in the second cellulosic dope.

16. The method according to claim 1, wherein the first cellulosic dope has a connatural saccharide content different from the connatural saccharide content of the second cellulosic dope.

17. The method according to claim 1, wherein the first cellulosic dope has a constituent not present in the second cellulosic dope.

18. The method according to claim 1, wherein the splittable composite regenerated cellulose fibers have at least 2 longitudinally-extending regenerated cellulose segments formed from the first cellulosic dope alternately juxtaposed with at least 2 longitudinally-extending regenerated cellulose segments formed from the second cellulosic dope such that juxtaposed segments formed from the cellulosic dopes of different compositions are joined along splittable interfaces therebetween.

19. The method according to claim 1, wherein the splittable composite regenerated cellulose fibers have at least 4 longitudinally-extending regenerated cellulose segments formed from the first cellulosic dope alternately juxtaposed with at least 4 longitudinally-extending regenerated cellulose segments formed from the second cellulosic dope such that juxtaposed segments formed from the cellulosic dopes of different compositions are joined along splittable interfaces therebetween.

20. The method according to claim 1, wherein the splittable composite regenerated cellulose fibers have at least 8 longitudinally-extending regenerated cellulose segments formed from the first cellulosic dope alternately juxtaposed with at least 8 longitudinally-extending regenerated cellulose segments formed from the second cellulosic dope such that juxtaposed segments formed from the cellulosic dopes of different compositions are joined along splittable interfaces therebetween.

21. The method according to claim 1, wherein the splittable composite regenerated cellulose fibers have at least 16 longitudinally-extending regenerated cellulose segments formed from the first cellulosic dope alternately juxtaposed with at least 16 longitudinally-extending regenerated cellulose segments formed from the second cellulosic dope such that juxtaposed segments formed from the cellulosic dopes of different compositions are joined along splittable interfaces therebetween.

22. The method according to claim 1, wherein the splittable fiber is a hollow segmented fiber.

23. The method according to claim 1, wherein at least one of the first and second cellulosic dopes comprise cellulose dissolved in a solvent comprising N-methyl morpholine-N oxide (NMMO).

24. The method according to claim 1, wherein the first and second cellulosic dopes comprise cellulose dissolved in a solvent comprising N-methyl morpholine-N oxide (NMMO).

25. The method according to claim 1, wherein at least one of the first and second cellulosic dopes comprise cellulose dissolved in a solvent comprising an ionic liquid.

26. The method according to claim 1, wherein the first and second cellulosic dopes comprise cellulose dissolved in a solvent comprising an ionic liquid.

27. The method according to claim 1, wherein at least one of the first and second cellulosic dopes comprise cellulose dissolved in a solvent comprising an ionic liquid, wherein the ionic liquid comprises an imidazolium salt.

28. The method according to claim 27, wherein the first and second cellulosic dopes comprise cellulose dissolved in a solvent comprising an ionic liquid, wherein the ionic liquid comprises a dialkylimidazolium salt.

29. A method of making microfibers of regenerated cellulose comprising:
   a) preparing a first cellulosic dope comprising cellulose dissolved in a solvent including an ionic liquid, the first cellulosic dope having a first composition;
   b) preparing a second cellulosic dope comprising cellulose dissolved in a solvent including an ionic liquid, the second cellulosic dope having a second composition which differs from the first composition of the first cellulosic dope;
   c) spinning the first and second cellulosic dopes into composite nascent fibers each having a length and a segmented cross-section comprising a plurality of segments across the cross-section of the nascent fiber, the segments also extending along the length of the fiber and the nascent fibers including at least one longitudinally-extending segment formed from the first cellulosic dope juxtaposed with at least one longitudinally-extending segment formed from the second cellulosic dope;
   d) regenerating the nascent fibers to splittable composite regenerated cellulose fibers each having a plurality of regenerated cellulose segments across the cross section of the regenerated fiber, the segments also extending along the length of the fiber and including at least a first longitudinally-extending regenerated cellulose segment formed from the first cellulosic dope juxtaposed with at least a second longitudinally-extending regenerated cellulose segment formed from the second cellulosic dope, wherein the first longitudinally-extending regenerated cellulose segment is joined to the second longitudinally-extending regenerated cellulose segment along a splittable interface; and
   e) splitting the composite regenerated cellulose fibers into microfibers of smaller cross-section along the splittable interface between segments and having a length weighted average length of from about 20% to about 50% of said larger splittable regenerated cellulose composite fibers,
   wherein said first cellulosic dope and second cellulosic dope are cellulosic dopes without other fiber-forming components.

30. The method according to claim 29, wherein at least one of the cellulose dopes comprises an ionic liquid which includes an imidazolium salt.

31. The method according to claim 30, wherein the imidazolium salt is 1-allyl-3-methylimidazolium chloride.

32. The method according to claim 29, wherein the first and second cellulosic dope each comprise the same ionic liquid.

33. The method according to claim 29, wherein the geometry of the nascent fibers is regulated, the first and second cellulosic dope compositions are selected, and the steps of regenerating and splitting the fibers are controlled, such that the composite regenerated cellulose fibers are split into microfibers with a microfiber yield of more than 50% based on larger splittable regenerated cellulose composite fibers subjected to step (e).

34. The method according to claim 29, wherein the splittable fiber is a hollow segmented fiber.

35. The method according to claim 29, wherein the first cellulosic dope contains dissolved cellulose having a first average degree of polymerization different from a second average degree of polymerization of dissolved cellulose in the second cellulosic dope.

36. The method according to claim 29, wherein the first cellulosic dope has a connatural saccharide content different from the connatural saccharide content of the second cellulosic dope.

37. A method of making a wet-laid absorbent sheet comprising:
   (a) preparing regenerated cellulose micro fibers fibers by way of:
      i) preparing a first cellulosic dope having a first composition;
      ii) preparing a second cellulosic dope having a second composition which differs from the first composition of the first cellulosic dope;
      iii) spinning the first and second cellulosic dopes into composite nascent fibers each having a length and a segmented cross-section comprising a plurality of segments across the cross-section of the nascent fiber, the segments also extending along the length of the fiber and the nascent fibers including at least one longitudinally-extending segment formed from the first cellulosic dope juxtaposed with at least one longitudinally-extending segment formed from the second cellulosic dope;

iv) regenerating the nascent fibers to splittable composite regenerated cellulose fibers each having a plurality of regenerated cellulose segments across the cross section of the regenerated fiber, the segments also extending along the length of the fiber and including at least a first longitudinally-extending regenerated cellulose segment formed from the first cellulosic dope juxtaposed with at least a second longitudinally-extending regenerated cellulose segment formed from the second cellulosic dope, wherein the first longitudinally-extending regenerated cellulose segment is joined to the second longitudinally-extending regenerated cellulose segment along a splittable interface; and v) splitting the composite regenerated cellulose fibers into microfibers of smaller cross-section along the splittable interface between segments, wherein the geometry of the nascent fibers is regulated, the first and second cellulosic dope compositions are selected, and the steps of regenerating and splitting the fibers are controlled, such that the composite regenerated cellulose fibers are split into microfibers with a coarseness between 0.05 mg/100 m and 10 mg/100 m with a microfiber yield of at least 50% based on larger splittable regenerated cellulose composite fibers subjected to step (a)(v), and having a length weighted average length of from about 20% to about 50% of said larger splittable regenerated cellulose composite fibers;

(b) preparing an aqueous furnish incorporating the regenerated cellulose microfibers made by step (a) as well as pulp-derived papermaking fibers;

(c) depositing the aqueous furnish on a foraminous support to form a nascent web and at least partially dewatering the nascent web; and (d) drying the web to provide absorbent sheet, wherein said first cellulosic dope and second cellulosic dope are cellulosic dopes without other fiber-forming components and micro fibers.

38. The method according to claim 37, wherein the aqueous furnish comprises a pulp derived fiber selected from Kraft hardwood fiber, Kraft softwood fiber, high yield fiber, recycle fiber and mixtures thereof.

39. The method according to claim 37, wherein the sheet has a basis weight of from about 5 lbs/3000 ft$^2$ ream to about 50 lbs/3000 ft$^2$ ream.

40. The method according to claim 37, wherein the sheet has a basis weight of from about 7.5 lbs/3000 ft$^2$ to about 35 lbs/3000 ft$^2$ ream.

41. The method according to claim 37, wherein the sheet comprises from about 1 wt % to about 30 wt. % of regenerated cellulose microfibers prepared by step (a).

42. The method according to claim 37, wherein the sheet comprises from about 10 wt. % to about 75 wt. % of regenerated cellulose microfiber prepared by step (a).

43. The method according to claim 37, wherein the sheet comprises from about 20 wt. % to about 70 wt. % of regenerated cellulose microfiber prepared by step (a).

44. The method according to claim 37, wherein the sheet comprises from about 30 wt. % to about 65 wt. % of regenerated cellulose microfiber prepared by step (a).

45. The method according to claim 37, wherein the sheet comprises from about 40 wt. % to about 60 wt. % of regenerated cellulose microfiber prepared by step (a).

46. The method according to claim 37, wherein the sheet exhibits a wet/dry CD tensile ratio greater than 30%.

47. The method according to claim 37, wherein the sheet exhibits a wet/dry CD tensile ratio of between about 35% and about 60%.

48. The method according to claim 37, wherein the sheet exhibits a wet/dry CD tensile ratio of at least about 40%.

49. The method according to claim 37, wherein the sheet exhibits a wet/dry CD tensile ratio of at least about 45%.

* * * * *